United States Patent
Ohno

(10) Patent No.: US 7,352,679 B2
(45) Date of Patent: Apr. 1, 2008

(54) PICKUP DRIVE UNIT AND INFORMATION PLAYBACK APPARATUS INCLUDING THE SAME

(75) Inventor: Takehide Ohno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 566 days.

(21) Appl. No.: 10/285,623

(22) Filed: Nov. 1, 2002

(65) Prior Publication Data

US 2003/0112726 A1 Jun. 19, 2003

(30) Foreign Application Priority Data

Nov. 8, 2001 (JP) ............ 2001-343132
May 14, 2002 (JP) ............ 2002-138611

(51) Int. Cl.
  *G11B 7/08* (2006.01)
(52) U.S. Cl. .............. 369/223; 369/218; 720/676
(58) Field of Classification Search ........... 369/223
  See application file for complete search history.

(56) References Cited

U.S. PATENT DOCUMENTS

| 5,502,702 | A * | 3/1996 | Nakajo ............ 369/53.22 |
| 6,335,915 | B1 * | 1/2002 | Uchiyama et al. ...... 369/223 |
| 2003/0012118 | A1 * | 1/2003 | Su et al. ............ 369/223 |
| 2003/0016616 | A1 * | 1/2003 | Nishimura et al. ..... 369/223 |
| 2004/0052198 | A1 * | 3/2004 | Liao ............... 369/223 |

FOREIGN PATENT DOCUMENTS

| JP | 5-234281 | 9/1993 |
| JP | 05-234281 | 9/1993 |
| JP | 10-074370 | 3/1998 |
| JP | 11-185407 | 7/1999 |
| JP | 2000-067534 | 3/2000 |

OTHER PUBLICATIONS

First Office Action of Chinese Patent Application No. 02150348.6 dated Sep. 10, 2004.
Japanese Office Action.

* cited by examiner

*Primary Examiner*—Andrea Wellington
*Assistant Examiner*—Michael V Battaglia
(74) *Attorney, Agent, or Firm*—Dickstein Shapiro LLP

(57) ABSTRACT

A pickup drive unit is provided including at least a rack portion provided thereon with gear teeth to be engaged with grooves of a lead screw; a plate-shaped connecting portion made of a flexible material for connecting the rack portion to a fixing portion tightened to a pickup and for supporting the rack portion in a cantilever fashion to be deformable in a direction of either bringing close to, or removing from, the lead screw; and a compressed coil spring for applying a force pressing the rack portion against the lead screw; in which the distance on the plate-shaped connecting portion from an end on the side of the fixing portion to the contact portion between the gear teeth and the lead screw is made smaller than the distance from an end on the side of said fixing portion to another end on the side of the rack portion. With the present construction, the gear teeth provided on the rack portion can be prevented from riding across the grooves on the lead screw, which is caused by a frictional force from the rotation of the lead screw in the tangential direction. In addition, the reduction of frictional loads, the increase in record/playback signal qualities, high speed access, and miniaturization can be achieved for the pickup drive unit.

12 Claims, 11 Drawing Sheets

PICKUP DRIVE UNIT AND INFORMATION PLAYBACK APPARATUS INCLUDING THE SAME

BACKGROUND

1. Field

This patent specification relates to a pickup drive unit and information record/playback apparatus with such drive units. The pickup drive unit is in use primarily for driving an optical pickup to either irradiate laser beams on an information recording medium, or detect light beams reflected from the recording medium.

2. Discussion of the Background

A pickup drive unit is known previously as exemplified by FIG. 11. That perspective view of the structure of the pickup drive unit, shows a pickup 61 equipped with several optical elements for irradiating light beams onto an optical disk, a guiding shaft 62 for guiding the pickup 61 during seek movements in the radial direction of an optical disk, a lead screw 63, which is a cylindrical shaft with spiral grooves provided thereon, and a motor 64.

The lead screw 63 rotates by its direct connection to the motor 64, in which the connection is made such that the screw axis of the former coincides with the rotation axis of the latter.

A rack member 65 is fixed to the pickup 61 to suitably transmit the movements of the lead screw 63. The rack member 65 includes a fixing portion 66 with which the rack member 65 is fixed to the pickup 61; a rack portion 67 provided thereon with gear teeth 69 (or gear portion 69) to be engaged with the grooves of lead screw 63; and a connecting portion 68, which is made of an elastic plate deformable in the direction perpendicular to the axis of lead screw 63 for connecting the fixing portion 66 to the rack portion 67.

The fixing portion 66 includes an L-shaped portion with a face of one of the ends thereof attached to the bottom face of the pickup 61, and two narrow elongated portions each extended from the opposing edges of the other end of the L-shaped portion along the direction of the extension of the bottom face. Respective ends of the connecting portion 68 are connected to the ends of the narrow elongated portions in the cantilever fashion, while the other ends of the connecting portion 68 are connected to the rack portion 67.

The face of rack portion 67 opposing the face having the gear portion 69 is situated directly opposing to the face of the fixing portion 66.

In addition, a compressed coiled spring 70 is located between these two faces of rack portion 67 and the fixing portion 66 to thereby be able to press the rack portion 67 against the lead screw 63.

Furthermore, since the gear portion 69 is then engaged with the grooves provided on the lead screw 63, the displacement suitable for the pickup 61 becomes feasible along the axial direction of the lead screw 63.

In the construction noted above, a frictional force which is produced at the contact portion between gear portion 69 and lead screw 63 by the rotation of the latter, results in a bending moment for the plate-shaped connecting portion 68. This gives rise to a force which acts to cause the rack portion 67 to be either brought close to, or removed from, the lead screw 63, depending on the direction of rotation of the lead screw 63.

FIG. 12A is a side view along the direction of the axis of lead screw 63, illustrating the location of the gear portion 69 engaged with the grooves on the lead screw 63. As shown in FIG. 12B, the shape of the rack member 65 is approximately of F-shaped as viewed along the axial direction.

When the lead screw 63 rotates clockwise as viewed along the direction of the screw axis as shown in FIG. 12A, a bending moment M1 is produced in the connecting portion 68 by a frictional force F1. As a result, the rack portion 67 is forced to be removed from the lead screw 63 in the direction illustrated by the arrow A.

In contrast, when the lead screw 63 rotates counterclockwise as viewed along the direction of the screw axis as shown in FIG. 12B, another bending moment M2 is produced in the connecting portion 68 by a frictional force F2. As a result, the rack portion 67 is forced to be pressed to the lead screw 63 in the direction illustrated by the arrow B.

When the lead screw 63 is rotated clockwise at relatively high speed so as to displace the pickup 61 at a high speed, the gear portion 69 tends to ride across the grooves on the lead screw 63 with more ease as the rack portion 67 is forced away from the lead screw 63. To prevent this, the coiled spring 70 has to be compressed harder to increase the force pressing the rack portion 67 against the lead screw 63.

In contrast, when the lead screw 63 rotates counterclockwise at relatively high speed, the rack portion 67 tends to be pressed harder to the lead screw 63.

With the increase in the strength of the force pressing the rack portion 67 against the lead screw 63, the frictional resistance produced at the contact portion between gear portion 69 and lead screw 63 increases.

This results in negative effects such as worsening record/playback signal qualities from the failure of the pickup 61 to be displaced minutely and smoothly. Also, the increased resistance may impede high speed access movements of the pickup 61.

In order to alleviate the above-noted problems, several techniques have been disclosed such as those described in Japanese Laid-Open Patent Applications No. 11-185407 ('407) and 2000-67534 ('534).

The former application '407 describes an improvement wherein the top of the gear portion 69, which engage with the grooves, are each formed in the shape of an arc so that they constitute a part of the circle representing the elastic bending of the arm of the connecting portion 68. As a result, the engagement of the gear portion 69 with the lead screw 63 is always kept constant even under tangential frictional force caused by the rotation of the lead screw 63.

The latter application '534 describes another improvement, wherein the stiffness of the lead screw 63 is increased against the moment in the tangential direction of rotation by supporting the rack member 65 by means of two parallel springs each made of resinous materials that prevent the gear portion 69 from riding across the grooves on the lead screw 63.

However, several problems remain unsolved.

For example, according to application '407, the distance between the gear portion 69 and lead screw 63 is unchanged even after including the bending of the arm portion. As a result, difficulties persist when an error arises in the distance between the pickup 61 and lead screw 63, and/or in the length of the arm portion because the lead screw 63 can no longer press the gear portion 69 with a force of proper magnitude. This gives rise to either looseness or an increase in friction at the contact portion between the gear portion 69 and the lead screw 63.

With respect to the device described in application '534 the resinous springs tend to have increased length and width. This may cause disadvantages and prevent the reduction of the overall size of the pickup unit. This disadvantage is more evident where optical disk units are to be incorporated into note-sized computer devices: It is desirable for the optical disk unit to be smaller in overall size. Preferably its height is reduced and also its width is reduced in the direction of lead screw axis. The optical unit, however, can not be reduced beyond a certain point since the portion of the resinous springs mechanically interferes with the motor for driving the lead screw.

SUMMARY

Accordingly, it is an object of the present invention to provide a pickup drive unit with several improvements, such as high speed access, miniaturization of the driving unit, and excellent driving capabilities, which are achieved by reducing the amount of displacement of the contact between a gear portion and lead screw and by stabilizing a pressing force with the addition of moment acting in the tangential direction of the rotation of the lead screw. Also described in the present disclosure is an information record/playback apparatus incorporating such pickup drive units.

It is another object of the present invention to provide a pickup drive unit, including at least a lead screw; a drive unit for driving the lead screw; a rack portion provided thereon with a gear portion (or gear teeth) to be engaged with grooves of the lead screw; a plate-shaped connecting portion made of a flexible material for connecting the rack portion to a fixing portion tightened to a pickup and for supporting the rack portion in a cantilever fashion to be deformable in a direction of either bringing close to, or removing from, the lead screw; and a pressing member for applying a force pressing the rack portion against the lead screw; in which the distance on the plate-shaped connecting portion from an end on the side of the fixing portion to the portion in contact between the gear teeth and the lead screw is smaller than the distance from an end on the side of said fixing portion to another end on the side of said rack portion.

With this construction of the pickup drive unit, the rack portion is formed to swing in such a direction that the contact between the gear teeth and lead screw is retained, even when the plate-shaped connecting portion is affected by the moment induced by a frictional force in the tangential direction from the rotation of the lead screw.

Therefore, the deformation at the portion in contact between the gear teeth and the lead screw can be suitably reduced. As a result, the gear teeth provided on the rack portion can be prevented from riding across the grooves on the lead screw, to thereby be able to obviate one of the aforementioned difficulties.

The following brief description is a synopsis of only selected features and attributes of the present disclosure. A more complete description thereof is found below in the section entitled "Description of the Preferred Embodiments."

According to one embodiment of the pickup drive unit disclosed herein, the distance as viewed from an axial direction of the lead screw from an end on the side of the fixing portion to the portion in contact between the gear teeth and the lead screw is preferably one half of the distance from an end on the side of the fixing portion to another end on the side of the rack portion.

With the above construction of the pickup drive unit, the deformation at the portion in contact between the gear teeth and the lead screw can be eliminated when the plate-shaped connecting portion is affected by the moment induced by a frictional force in the tangential direction from the rotation of the lead screw. As a result, several advantages can be offered. The gear teeth provided on the rack portion can be prevented from riding across the grooves on the lead screw, undue increases in the strength of the pressing force are obviated, and frictional loads are reduced to thereby prevent worsening record/playback signal qualities. In addition, proper pickup drive operations with reduced frictional loads, high speed access, and miniaturization can be achieved for the pickup drive unit.

According to another embodiment, the pickup drive unit disclosed herein is characterized by the plate-shaped connecting portion which is formed to be situated on both sides of the rack portion in the axial direction of the lead screw. As a result, the deformation of the rack portion becomes difficult in that direction, access capabilities of the pickup are further improved and stable operations become feasible for the drive unit.

According to still another embodiment, the pickup drive unit is characterized herein by the plate-shaped connecting portion made of metal. The connecting portion can therefore serve also as the pressing member for applying a force pressing the rack portion against the lead screw, thereby eliminating the use of a compressed coil member. This facilitates a further miniaturization and cost reduction of the drive unit.

According to one more embodiment, a pickup drive unit is provided, including at least a lead screw; a drive unit for driving the lead screw; a rack portion provided thereon with gear teeth to be engaged with grooves of the lead screw; a plate-shaped connecting portion made of a flexible material for connecting the rack portion to a fixing portion tightened to a pickup and for supporting the rack portion in a cantilever fashion to be deformable in a direction of either bringing close to, or removing from, the lead screw; and a pressing member for applying a force pressing the rack portion against the lead screw; in which the tangential direction of the portion in contact between the gear teeth and the lead screw approximately coincides with the plane on the extension of the plate-shaped connecting portion.

As a result, a bending moment does not appear for the part of connecting portion, even when a frictional force in the tangential direction is caused by the rotation of the lead screw.

In the pickup drive unit disclosed just above, further included is the plate-shaped connecting portion made of metal. Since this connecting portion can serve also as the pressing member for applying a force pressing the rack portion against the lead screw, thereby eliminating the use of an additional compressed coil member, further miniaturization and cost reduction of the drive unit can be achieved.

According to another embodiment, an information playback apparatus is disclosed, which includes a pickup for detecting light beams reflected from an information recording medium; a pickup drive unit for driving said pickup; and a plurality of circuits for playing back information from the information recording medium based on light beams detected by said pickup, in which the pickup drive unit is preferably one among those recited above.

Additionally, an information recording apparatus is disclosed, which includes a pickup for irradiating laser beams and recording information on an information recording medium; a pickup drive unit for driving the pickup, where said pick up drive unit is preferably one of those recited above; and a plurality of circuits for at least modulating the laser beams based on information signals.

The resultant information record/playback apparatus can offer several improved features such as excellent record/playback signal quality and high speed access capability.

The present invention, and the features and advantages thereof, will be more readily apparent from the following detailed description and appended claims when taken with drawings.

DESCRIPTION OF THE PREFERRED EMBODIMENTS

In the detailed description which follows, specific embodiments of unit portions and apparatus are described, which are particularly useful for suitably driving an optical pickup utilized in an information recording/playback system.

It is understood, however, that the present disclosure is not limited to these embodiments. For example, the portions disclosed herein may also be adaptable to any form of minute and smooth driving of precision apparatuses. Other embodiments will be apparent to those skilled in the art upon reading the following description.

Figure 1:
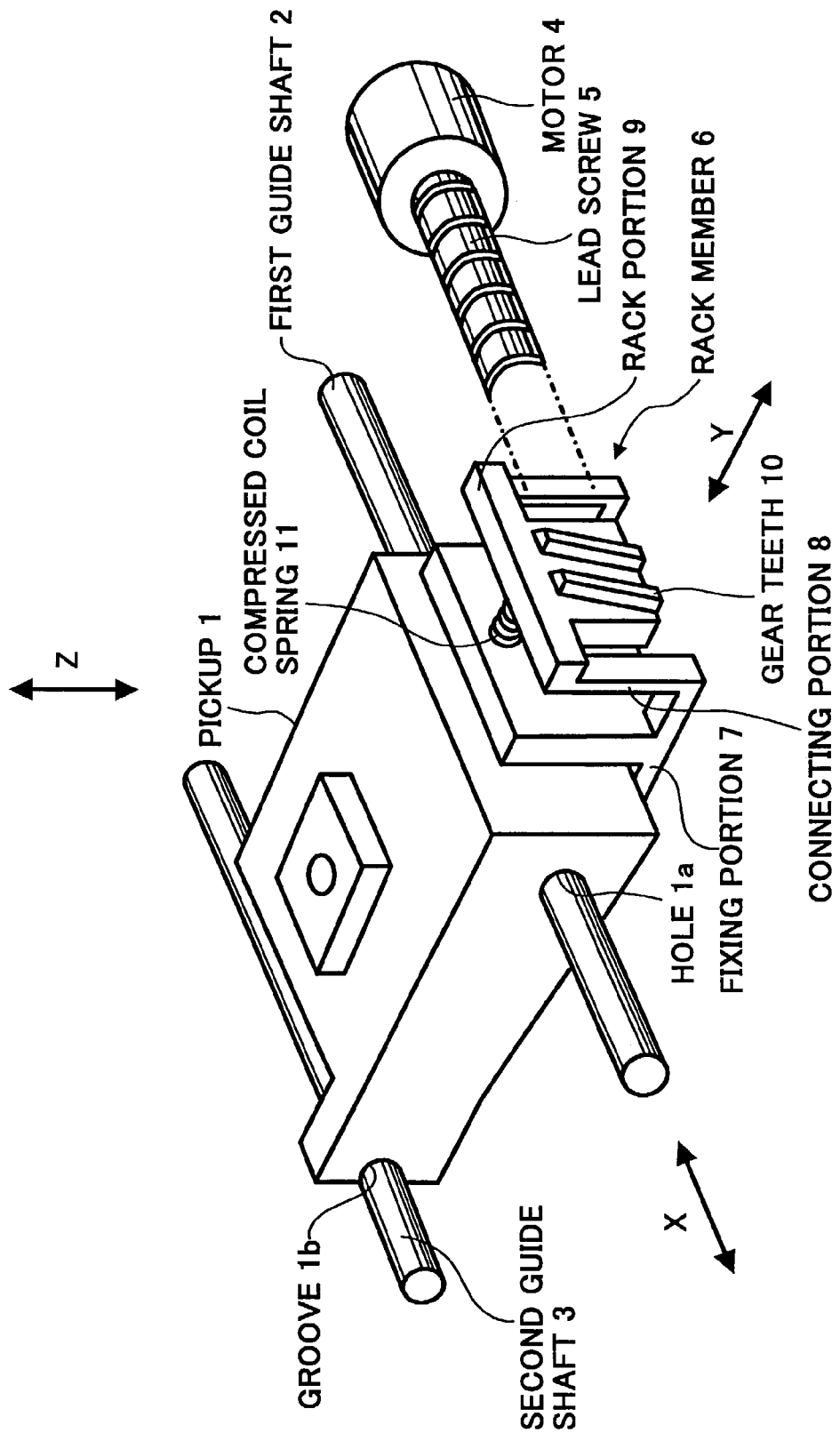
FIG. 1 is a perspective view illustrating the structure of a pickup drive unit according to one embodiment disclosed herein.

FIG. 1 is a perspective view illustrating the structure of a pickup drive unit according to one embodiment disclosed herein.

The pickup drive unit includes a pickup 1 equipped with several optical elements for implementing light beam irradiation onto an optical disk, a first guiding shaft 2 for guiding the pickup 1 in the radial direction of the optical disk, a second guiding shaft 3 provided in the parallel alignment with the first guiding shaft 2 for guiding the pickup 1 also in the radial direction of the optical disk, a motor 4, and a lead screw 5 having a cylindrical shaft with spiral grooves provided thereon.

The lead screw 5 rotates by its direct connection to the motor 4, in which the connection is made such that the screw axis of the former coincides with the rotation axis of the latter.

For purposes of explanations which follows, the first direction which coincides with the central axis of the first guiding shaft 2, the second direction which is orthogonal to the first direction and views a side face of the pickup 1, and the third direction which is orthogonal to both first and second directions and views a plane face of the pickup 1, are designated as X-, Y-, and Z-direction, respectively.

The pickup drive unit also includes a rack member 6, which is fixed to the pickup 1, for transmitting the rotational movements of the lead screw 5.

The rack member 6 includes a fixing portion 7 with which the rack member 6 is fixed to the pickup 1; a rack portion 9 with gear teeth 10 provided thereon to be engaged with the grooves of lead screw 5; and a plate-shaped connecting portion 8 for connecting the fixing portion 7 to the rack portion 9.

The rack member 6 is formed of a resinous material in an integrated fashion combining several portions such as the fixing portion 7, rack portion 9, and connecting portion 8. The connecting portion 8 is formed as a thin plate.

The fixing portion 7 includes an L-shaped portion with a face of one of the ends thereof attached to the bottom face of the pickup 1, and two narrow elongated portions each extended out from the opposing edges of the other end of the L-shaped portion along the direction of the extension of the bottom face.

Respective ends of the connecting portion 8 are connected to the ends of narrow elongated portions, while the other ends of the connecting portion 8 are connected to the rack portion 9 provided thereon with gear teeth 10. The rack member 6 is fixed to the pickup 1 by tightening the fixing portion 7 onto pickup 1 with a screw.

Being formed with an approximately T-shaped sheet member as viewed from the Y-direction, the rack portion 9 is provided in the middle thereof with the gear teeth 10, and the both ends thereof are supported by the connecting portion 8.

The connecting portion 8 is thus incorporated into the pickup drive unit with its longer side along the Z-direction perpendicular to the axial direction of the lead screw, and is therefore made elastically deformable in the direction of either bringing close to, or removing from, the lead screw 5 (Y-direction).

The back face of rack portion 9 from the face provided with the gear teeth 10 is situated directly opposing the face of the fixing portion 7. In addition, a compressed coiled spring 11 is provided between these two faces of rack portion 9 and the fixing portion 7 to allow the rack portion 9 to press against the lead screw 5.

The main portion of the pickup 1 for implementing record/playback operations on an optical disk is provided with a hole 1a on one side thereof for allowing the first guiding shaft 2 to penetrate through, and a U-shaped groove portion 1b on the other side thereof for accommodating the second guiding shaft 3.

By means of the first and second guiding shafts, 2 and 3, the main portion of the pickup 1 is movably supported along the radial direction of the optical disk.

The lead screw 5 is aligned in parallel with the guiding shafts, 2 and 3, and rotates by its direct connection to the motor 4. The guiding shafts, 2 and 3, and motor 4 are respectively fixed to a base plate (not shown). One end of the lead screw 5 is connected to the rotation axis of the motor 4, while the other end thereof is rotatably supported by a bearing (not shown).

With the grooves provided on the lead screw 5, the gear teeth 10 are then engaged, and the pickup 1 is properly displaced in the radial direction of the optical disk through the rotation of the lead screw 5, to enable minute drives during record/play back operations as well as high speed driving movements during access periods.

Figure 2:
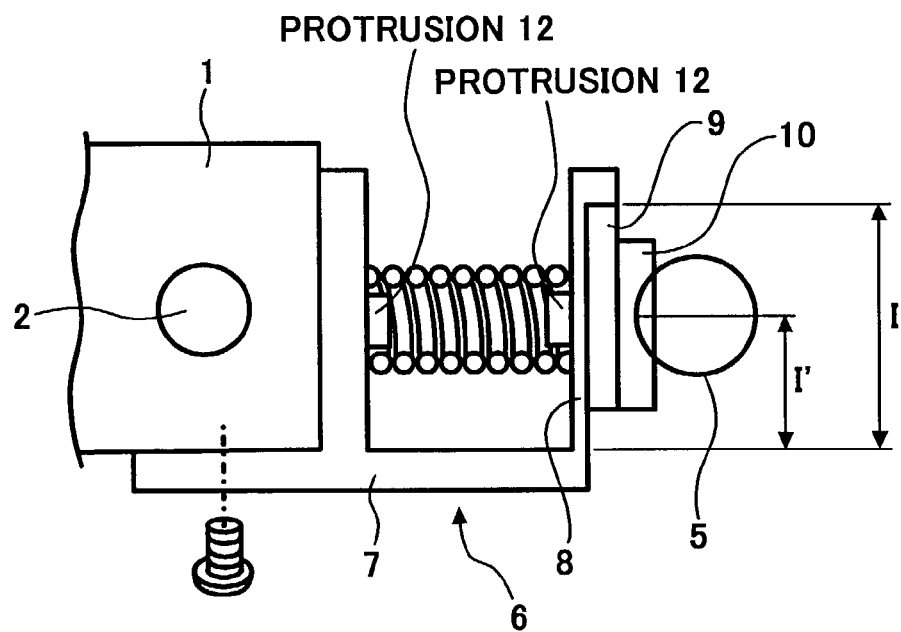
FIG. 2 is a side view along the direction of the axis of lead screw, illustrating the portion of FIG. 1 at least in vicinity of the lead screw and connecting portion 8.

FIG. 2 is a side view along the direction of the axis of lead screw 5, illustrating the portion of FIG. 1 at least in vicinity of the lead screw 5 and connecting portion 8. Also included in the drawing are protrusions 12 for positioning, and then preventing the dislocation of, a compressed coiled spring 11 provided between opposing faces of the rack portion 9 and fixing portion 7. As shown in FIG. 2, the shape of the rack member 6 is approximately F-shaped as viewed along the X-direction.

The connecting portion 8 is situated from the fixing portion 7 extending upward in the Z-direction and connected to the rack portion 9. The distance, I', in the Z-direction from the upper face of the connecting portion 8 to the contact portion between gear teeth 10 and lead screw 5 is smaller than the distance, I, from the upper face of the connecting portion 8 to the end of the rack portion 9.

Figure 3:
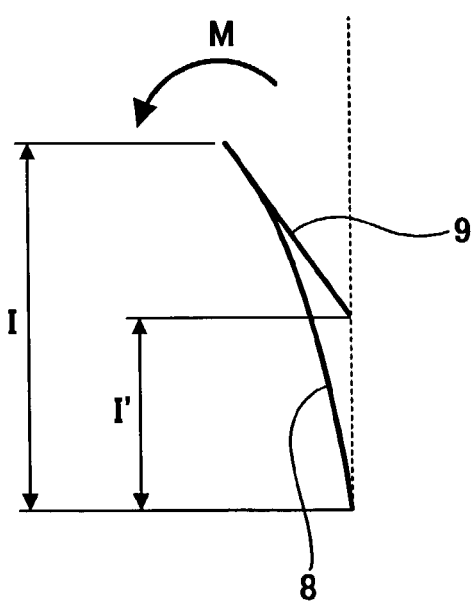
FIG. 3 is a drawing schematically illustrating the portions of FIG. 2.

FIG. 3 is a further view schematically illustrating the connecting portion 8 and the rack portion 9 of FIG. 2.

Referring to FIG. 3, when the lead screw 5 rotates clockwise as viewed along the direction of the screw axis, it gives rise to a frictional force F1 upward at the gear teeth 10 and a concurrent bending moment M is produced in the connecting portion 8 in the direction as designated by the arrow in FIG. 3.

By the bending moment M1 applied, the end portion of the connecting portion 8 close to rack portion 9 is on the verge of the movements in the direction removed from the lead screw 5. At the same time, an inclination is caused at this end portion of the connecting portion 8, and the rack portion swings in such a direction that the gear teeth 10 are brought closer to the lead screw 5.

As a result, the deformation which is caused by the above noted movement of the end portion of the connecting portion 8 toward the direction away from the lead screw 5, can be cancelled out.

The amount of displacement of a cantilever caused by a bending moment is given by the following expression. Namely, for the displacement, v, of the tip, $$v = M*L^2/(2*E*I) \qquad (1),$$

where M is bending moment, L the length of cantilever, E Young's modulus, and I the section of geometrical moment of inertia.

The amount of inclination of the tip is given by the following expression;

$$i = M*L/(E*I) \qquad (2).$$

In addition, there given by the following expression is the amount of displacement at the distance, x, from the tip for a straight line drawn downward with the inclination, i, from the tip;

$$v - i*x = M*L^2/(2*E*I) - M*L/(E*I)*x. \qquad (3)$$

Therefore, the left side of the expression is zero with $$x = L/2 \qquad (4).$$

That is, when the distance in the Z-direction from the upper face of the connecting portion 8 to the portion in contact between the gear teeth 10 and lead screw 5 is one half of the distance from the upper face of the connecting portion 8 to the end of the rack portion 9 (i.e., I'=½), the amount of displacement of the connecting portion 8 caused by the bending moment is just offset by the amount of displacement of gear teeth 10 toward lead screw 5 caused by the inclination of the rack portion 9.

Therefore, the above noted effects of frictional moment on the lead screw 5 in the tangential direction of rotation can be cancelled.

In a similar manner, when the lead screw 5 rotates counterclockwise as viewed along the direction of the screw axis, another frictional force is given rise to upward at the gear teeth 10.

Although this bring the connecting portion 8 close to rack portion 9 on the verge of the movements toward the lead screw 5, an inclination is caused at the same time in the end portion of the connecting portion 8. The rack portion then swings in such a direction that the gear teeth 10 are moved away from the lead screw 5.

As a result, the deformation which is caused by the movement of the end portion of the connecting portion 8 toward the direction of the lead screw 5 can be cancelled out thereby preventing undue increase the strength of pressing force of the rack portion 9 toward the lead screw 5.

Since the distance I' from the upper face of the connecting portion 8 to the contact portion between gear teeth 10 and lead screw 5 is made smaller in the present embodiment than the distance I from the upper face of the connecting portion 8 to the end of the rack portion 9, the strength of the force counteracting the pressing force with compressed coiled spring 11 can be decreased by the concurrent inclination caused at the end portion of the connecting portion 8, even when the rack portion 9 is affected by the force in the direction removed away from the lead screw 5 caused by the clockwise rotation of lead screw 5.

As a result, it becomes harder for the gear teeth 10 to ride across the grooves on the lead screw 5. Since this facilitates not unduly increasing the pressing force by the coiled spring 11, the suitable rotation of the lead screw 5 can be achieved with reduced loads.

In addition, even when the rack portion 9 is affected by the force toward the lead screw 5 caused by the counterclockwise rotation of lead screw 5 in contrast to the above case, the strength of the pressing force onto the rack member 6 decreases by the inclination of the rack member 6, and the strength of the pressing force from the rack portion 9 to lead screw 5 can be maintained.

As a result, since the fluctuation of frictional resistance is reduced at the portion in contact between the gear teeth 10 and the grooves on the lead screw 5, it becomes feasible for the pickup 1 to be displaced minutely and smoothly during record/playback operations.

In addition, since the rack portion 9 and connecting portion 8 are provided overlapping one another in the Z-direction as viewed from the X-direction, the miniaturization in the Z-direction becomes feasible for the both portions at the same time.

Furthermore, since the larger side of the connecting portion 8 and rack portion 9 do not have to be aligned sequentially in the axial direction of the lead screw 5, the length of the lead axis can be formed smaller in that direction.

In addition, since the location of the connecting portion 8 in the axial direction of the lead screw 5 is situated in the present disclosure not on one side but on both sides of the rack portion 9, the deformation of the rack portion 9 is hard to take place in that direction with respect to the fixing portion 7.

As a result, access capabilities of the pickup 1 are further improved and stable operations become feasible for the pickup drive unit.

Figure 4:
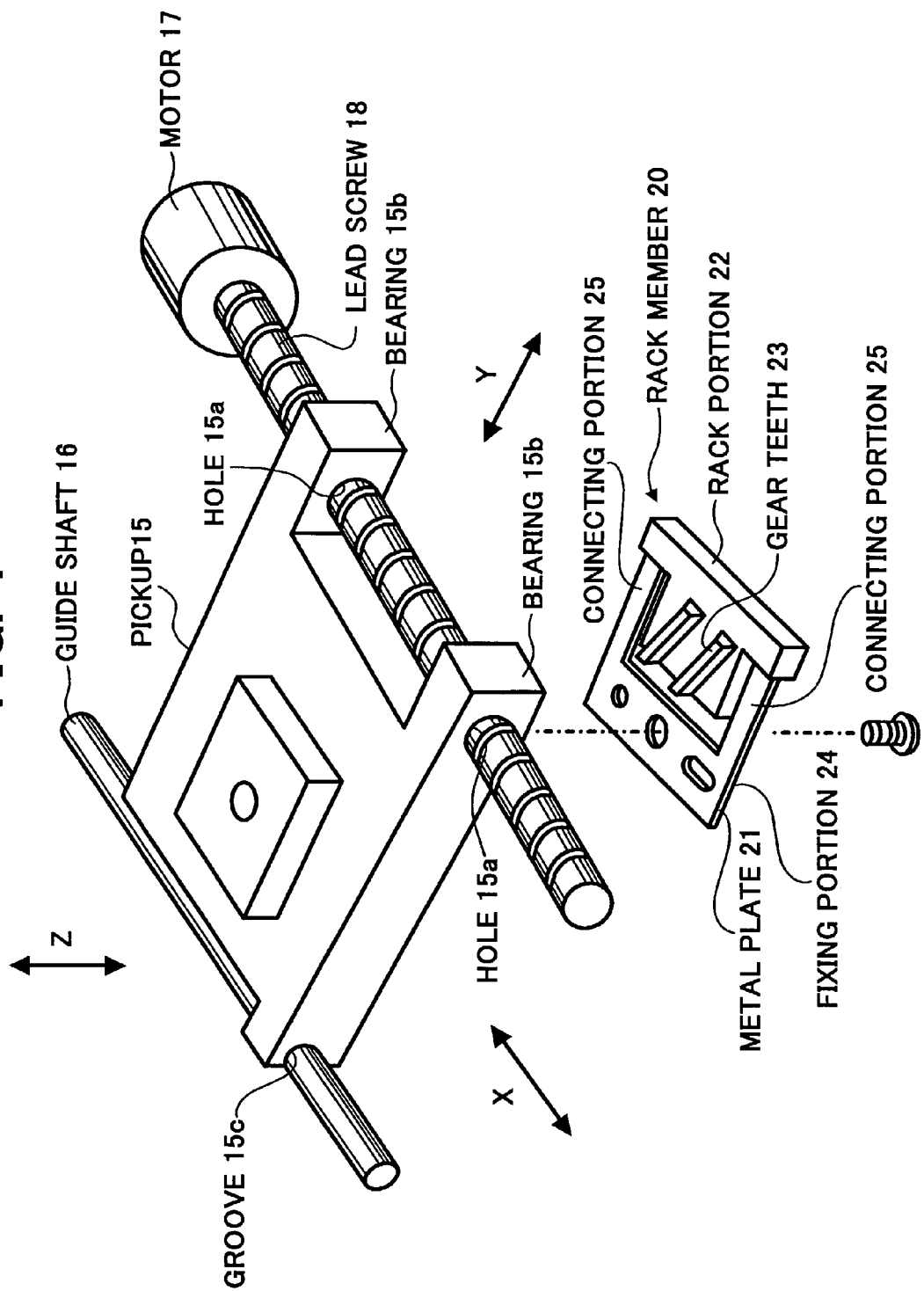
FIG. 4 is a perspective view illustrating the structure of a pickup drive unit according to another embodiment disclosed herein.

FIG. 4 is a perspective view illustrating the structure of a pickup drive unit according to another embodiment disclosed herein.

The pickup drive unit includes a pickup 15 equipped with several optical elements for implementing light beam irradiation on an optical disk, a guiding shaft 16 for guiding the pickup 15 in the radial direction of the optical disk, a motor 17, and a lead screw 18 of cylindrical shaft provided thereon with spiral grooves.

The lead screw 18 rotates by its direct connection to the motor 17, in which the connection is made such that the screw axis of the former coincides with the rotation axis of the latter.

The pickup drive unit is also provided with a rack member 20. The rack member 20 includes a plate 21 made of metal such as, phosphor bronze, and a rack portion 22 made of resinous material and provided thereon with gear teeth 23 to be engaged with the grooves of lead screw 18.

The rack portion 22 is formed with an approximately T-shaped sheet member in a similar manner to the rack portion 9 of FIG. 1, and is provided in the middle thereof with the gear teeth 23.

The metal plate 21 is approximately U-shaped as viewed from the Z-direction and includes a fixing portion 24 with which the rack member 20 is screw fixed to the pickup 15, and a connecting portion 25 with two narrow elongated portions each extending from the opposing edges of the fixing portion 24 to respective edges of the rack portion 25 to thereby support the rack portion 22.

Figure 5:
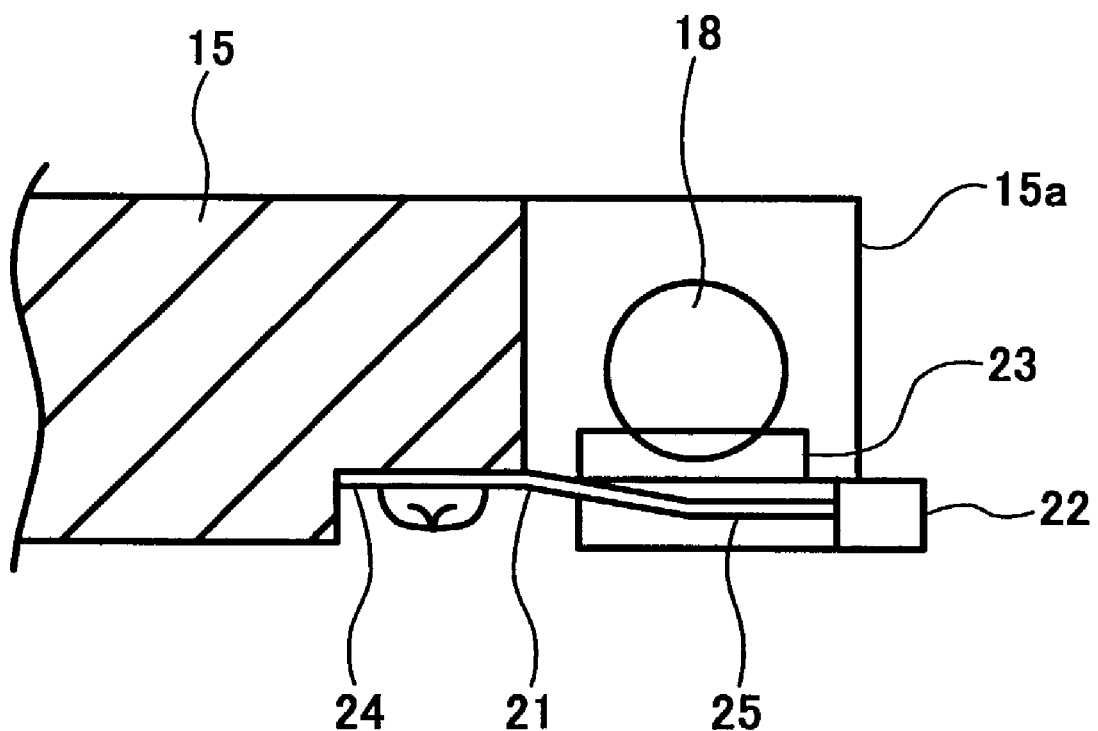
FIG. 5 is a side view along the direction of the axis of the lead screw, illustrating the portion of FIG. 4 at least in vicinity of the lead screw and connecting portion.

In addition, the rack member 20 is formed with the metal plate 21 by being enclosed with the rack portion 22 (FIG. 5). Thereafter, the rack member 20 is fixed to the pickup 15.

One side of the main portion of the pickup 15 is provided with pillow blocks making up bearings 15*b* which are formed by extending out from two opposing edges of the pickup 15 each having through-holes 15*a* for allowing the lead screw 18 to penetrate.

Provided on the other side of the main portion of the pickup 15, is a U-shaped groove 15*c* for accommodating the guiding shaft 16.

By means of the guiding shaft 16 and lead screw 18, the main portion of the pickup 15 is guided to be movably supported along the radial direction of the optical disk.

The rack member 20 is screw fixed onto the bottom face of the pickup 15 such that the rack portion 22 is located between two pillow blocks 15*b* which are formed to slidably accommodate the lead screw 18 serving also as a guide shaft as well.

The fixing portion 24 is provided with several holes such as one circular and another elongated for positioning, and still another circular for screw fixing. Provided at the locations on the bottom face of the pickup 15 corresponding to above holes are two bosses for the positioning and one screw hole.

Since the gear teeth 23 are situated inside of the U-shaped grove of metal plate 21 when the rack member 20 is fixed onto the pickup 15, the distance on the connecting portion 25 from the end on the side of fixing portion 24 to the portion in contact between gear teeth 23 and lead screw 18 is smaller than the distance from the end on the side of the fixing portion 24 to the other end on the side of the rack portion 22.

FIG. 5 is a side view along the direction of the axis of lead screw 5, illustrating the portion of FIG. 4 at least in vicinity of the lead screw 18 and connecting portion 25.

Since the fixing portion 24 is positioned on the pickup 15 such that the connecting portion 25 is mounted slightly bent, the rack portion 22 can be pressed against the lead screw 18 by the restoring force from blade spring characteristics of the connecting portion 25.

The distance from the end on the side of fixing portion 24 to the portion in contact between gear teeth 23 and lead screw 18 is thus made smaller than the distance from the end on the side of the fixing portion 24 to the other end on the side of the rack portion 22 in the present embodiment as well.

Therefore, it becomes harder for the gear teeth 23 to ride across the grooves on the lead screw 18 in a similar manner to the aforementioned embodiment even when the rack portion 22 is affected by the force in the direction removed away from the lead screw 18 caused by the clockwise rotation of lead screw 18.

As a result, undue increase in the pressing force can be obviated by the restoring force from the connecting portion 25, and the suitable rotation of the lead screw 18 can be achieved with reduced loads.

In addition, even when the rack portion 22 is affected by the force toward the lead screw 18 caused by the counterclockwise rotation of lead screw 18 in contrast to the above case, the fluctuation of frictional resistance is reduced at the portion in contact between the gear teeth 23 and the grooves on the lead screw 18.

As a result, it becomes feasible for the pickup 15 to be displaced minutely and smoothly during record/playback operations.

In addition, a compressed coiled spring can be eliminated as a means for applying a pressing force onto the rack portion 22 in the structure disclosed herein. The rack portion 22 may therefore be situated either above or below the lead screw 18, and the lead screw 18 can serve also as one of guiding shafts, since no space is necessary for installing the compressed coiled spring.

Furthermore, by adjusting the distance on the connecting portion 25 from the end on the side of fixing portion 24 to the portion in contact between gear teeth 23 and lead screw 18 to be one half of the distance from the end on the side of the fixing portion 24 to the other end on the side of the rack portion 22, the effects of frictional moment on the lead screw 18 in the tangential direction of rotation can be cancelled, in a similar manner to the aforementioned embodiment.

Figure 6:
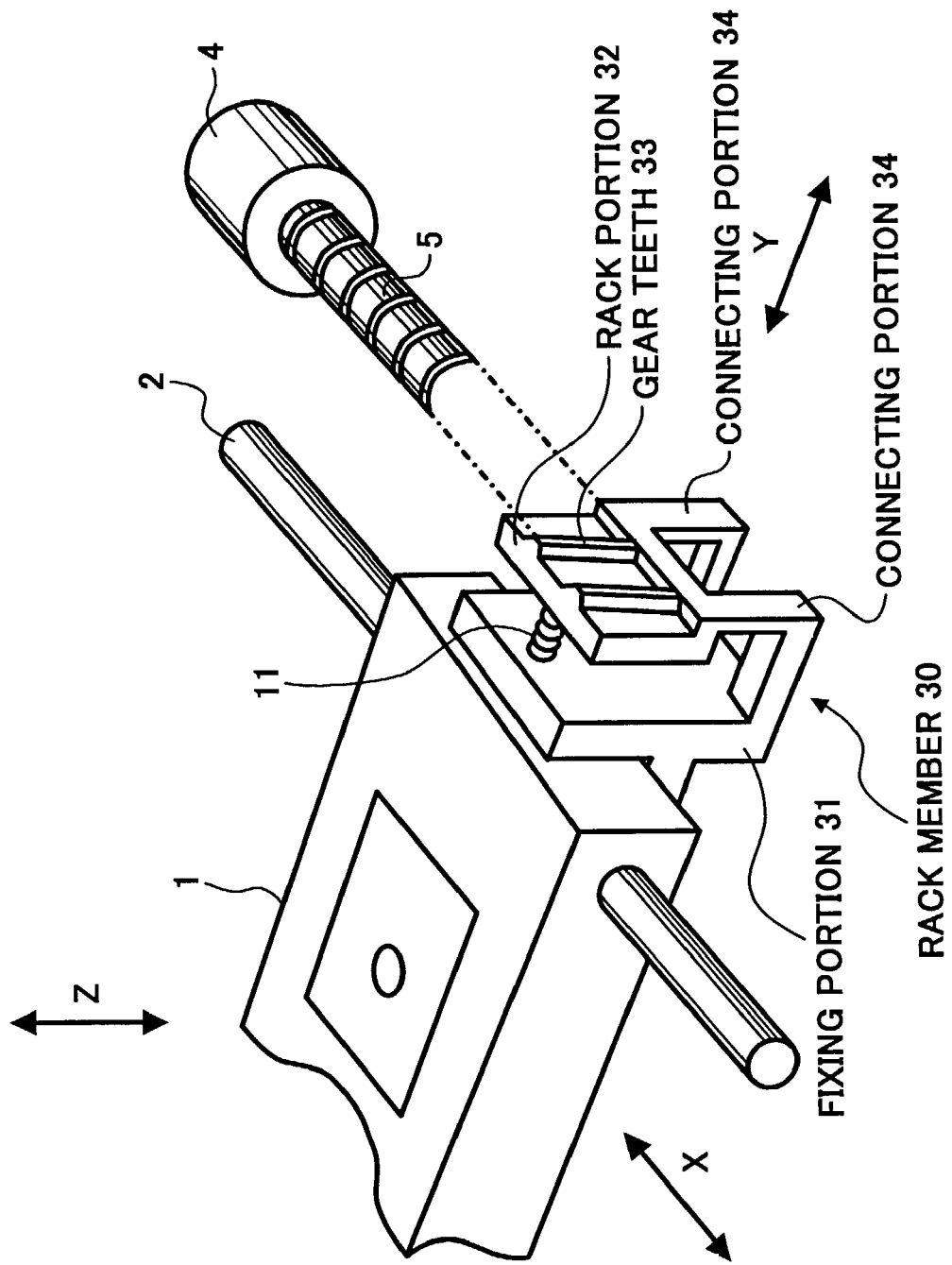
FIG. 6 is a perspective view illustrating the structure of a pickup drive unit according to still another embodiment disclosed herein.

FIG. 6 is a perspective view illustrating the structure of a pickup drive unit according to still another embodiment disclosed herein.

Referring to FIG. 6, being fixed onto the pickup 1, a rack member 30 is provided for transferring the rotation of the lead screw 5 to the pickup 1. In addition, like reference symbols in FIG. 6 designate identical or corresponding parts in FIG. 1, in which the description on these similar parts is herewith abbreviated.

The rack member 30 includes a fixing portion 31 with which the rack member 30 is fixed to the pickup 1, a rack portion 32 provided thereon with gear teeth 33 to be engaged with the grooves of lead screw 5, and a connecting portion 34 provided elastically deformable in the Y-direction for connecting the fixing portion 31 to the rack portion 32.

The rack member 30 is formed of a resinous material in an integrated fashion combining several portions such as the fixing portion 31, connecting portion 34, and rack portion 32. The connecting portion 34 among these portions is formed as a thin plate.

The fixing portion 31 includes an T-shaped portion with a face of one of the end thereof attached to the bottom face of the pickup 1, and two narrow elongated portions each extended from the opposing edges of the other end of the T-shaped portion along the direction of the extension of the bottom face.

Respective ends of the connecting portion 34 are connected to the ends of narrow elongated portions, while the other ends of the connecting portion 34 are connected to the rack portion 32 provided thereon with gear teeth 33.

Being formed with a rectangular-shaped sheet member as viewed from the Y-direction, the rack portion 32 is provided in the middle thereof with the gear teeth 33, and the both ends thereof are supported by the connecting portions 34.

The connecting portions 34 are thus incorporated into the pickup drive unit with its longer side along the Z-direction perpendicular to the axial direction of the lead screw, and made elastically deformable in the direction of either bringing close to, or removing from, the lead screw 5.

The back face of rack portion 32 from the face provided thereon with the gear teeth 33 is situated directly opposing to the face of the fixing portion 31. In addition, a compressed coiled spring 11 is provided between these two faces of rack portion 32 and the fixing portion 31, to thereby be able to press the rack portion 32 against the lead screw 5.

Figure 7:
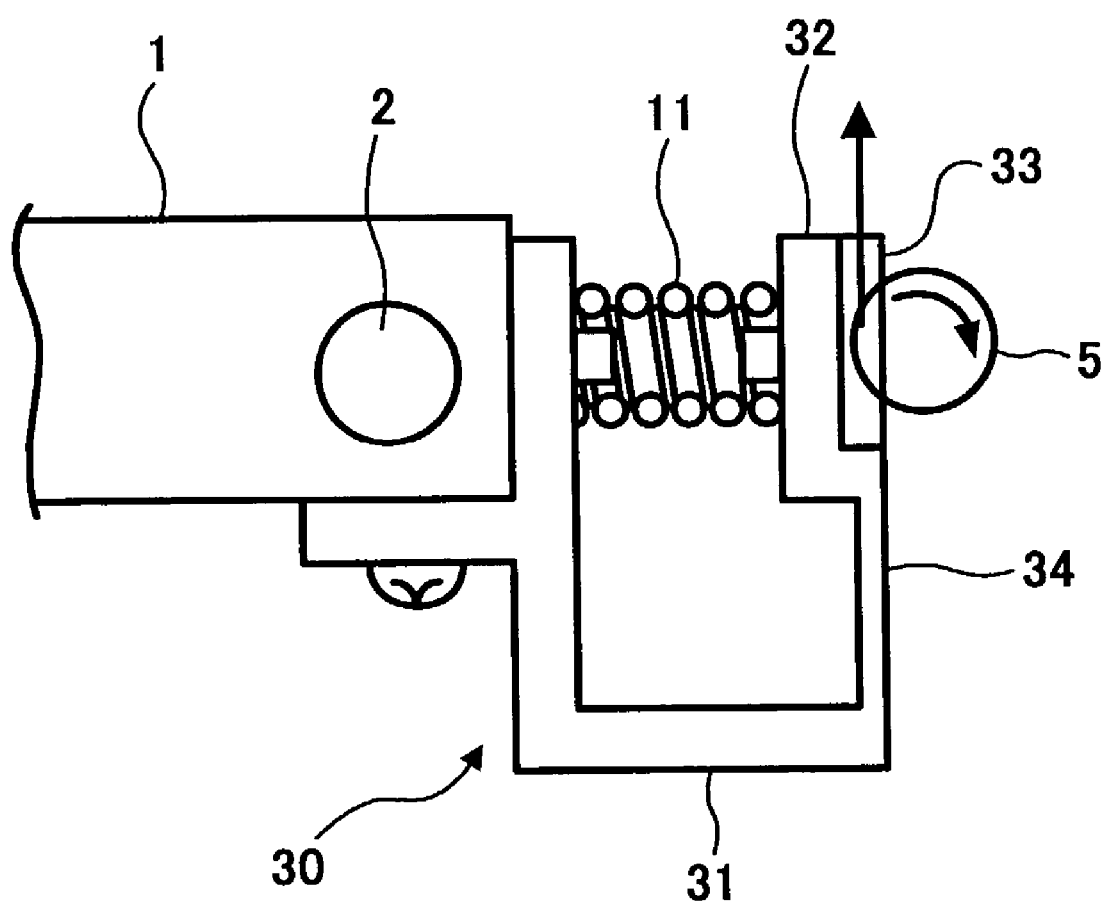
FIG. 7 is a side view along the direction of the axis of lead screw, illustrating the portion of FIG. 6 at least in vicinity of the lead screw and connecting portion.

FIG. 7 is a side view along the direction of the axis of lead screw 5, illustrating the portion of FIG. 6 at least in vicinity of the lead screw 5 and connecting portion 34.

The direction extending from the connecting portion 34 coincides with the tangential direction of portion the in contact between the gear teeth 33 and lead screw 5, and a tangent of the contact portion between the gear teeth 33 and lead screw 5 is included in the same plane as that of connecting portion 34.

Since the gear teeth 33 are situated on the extension of the connecting portion 34 in this embodiment, a bending moment does not appear for the part of connecting portion 34, even when a frictional force in the tangential direction is caused by the rotation of the lead screw 5.

That is, the aforementioned disadvantage caused by the force which is generated by the rotation of the lead screw 5 and acting on the rack portion 32 in the direction away from the lead screw 5, can be obviated preventing the gear teeth 33 from riding easily across the grooves on the lead screw 5.

As a result, undue increases in the strength of pressing force by the coiled spring 11 become unnecessary, and proper rotational drive of the lead screw 5 can be achieved with reduced loads.

Figure 8:
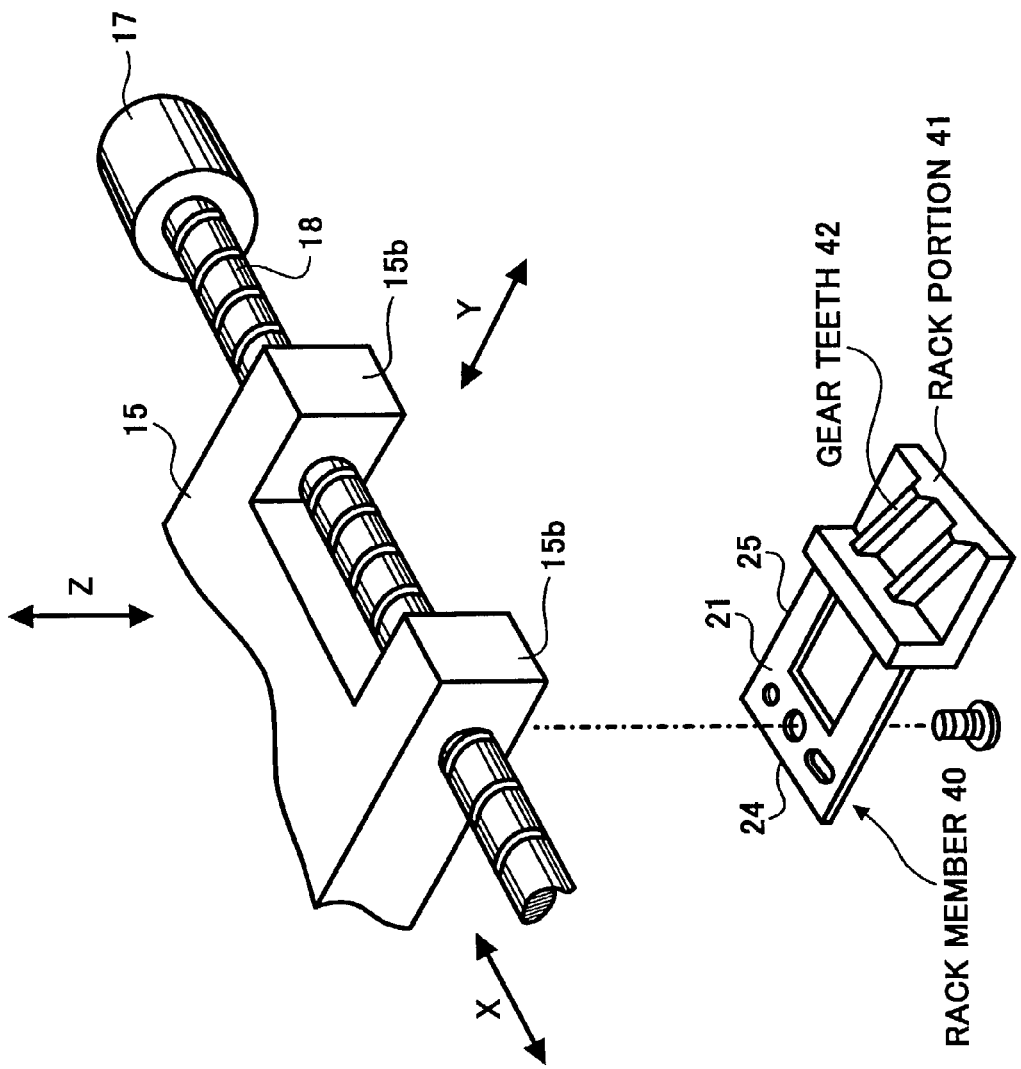
FIG. 8 is a perspective view illustrating the structure of a pickup drive unit according to another embodiment disclosed herein.

FIG. 8 is a perspective view illustrating the structure of a pickup drive unit according to another embodiment disclosed herein.

Referring to FIG. 8, the pickup drive unit includes at least a rack member 40 incorporating rack portion 41 provided thereon with a gear teeth 42 to be engaged with the grooves of lead screw 18. Like reference symbols in FIG. 8 designate identical or corresponding parts in FIG. 4, in which the description on these similar parts is herewith abbreviated.

In place of the gear teeth 23 of FIG. 4 provided inside the U-shaped metal plate 21 in one of the aforementioned embodiments, the present gear teeth 42 of FIG. 8 are provided outside the U-shaped metal plate 21.

Figure 9:
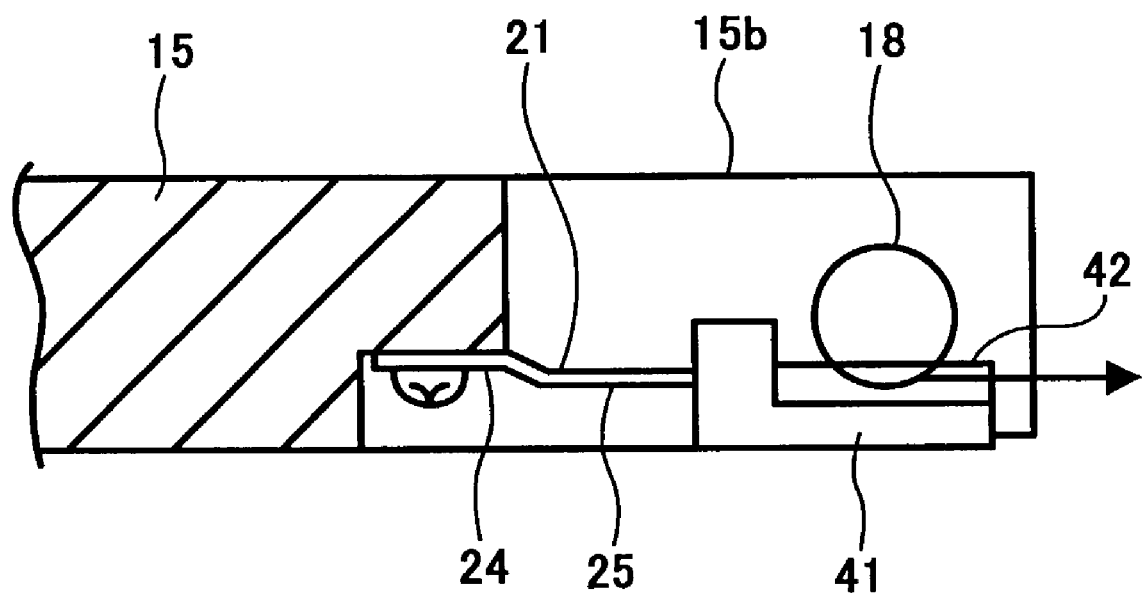
FIG. 9 is a side view along the direction of the axis of lead screw, illustrating the portion of FIG. 8 at least in vicinity of the lead screw and connecting portion.

FIG. 9 is a side view along the direction of the axis of lead screw 5, illustrating the portion of FIG. 8 at least in vicinity of the lead screw 18 and connecting portion 25.

The connecting portion 25 is positioned on the pickup 15 so as to be slightly bent, in a similar manner to the earlier embodiment, and the rack portion 41 is pressed against the lead screw 18 by the restoring force from blade spring characteristics of the connecting portion 25. In addition, the gear teeth 42 are situated on the extension of the connecting portion 25.

Since a compressed coiled spring can be eliminated as a means for applying a pressing force onto the rack portion 41 in the present embodiment, the rack portion 41 may be situated either above or below the lead screw 18. In addition, since no space is necessary for installing the compressed coiled spring, the lead screw 18 can serve also as one of guiding shafts.

The direction along the longer side of the connecting portion 25 coincides with the tangential direction of the portion in contact between the gear teeth 42 and lead screw 18. A bending moment, therefore, does not appear for the part of connecting portion 25, even when a frictional force in the tangential direction is caused by the rotation of the lead screw 18.

That is, the aforementioned disadvantage caused by the force which is generated by the rotation of the lead screw 18 and acting on the rack portion 41 in the direction away from the lead screw 5, can be obviated preventing the gear teeth 42 from riding easily across the grooves on the lead screw 18.

As a result, undue increases in the strength of pressing force by the coiled spring become unnecessary, and proper rotational drive of the lead screw 5 can be achieved with reduced loads.

Figure 10:
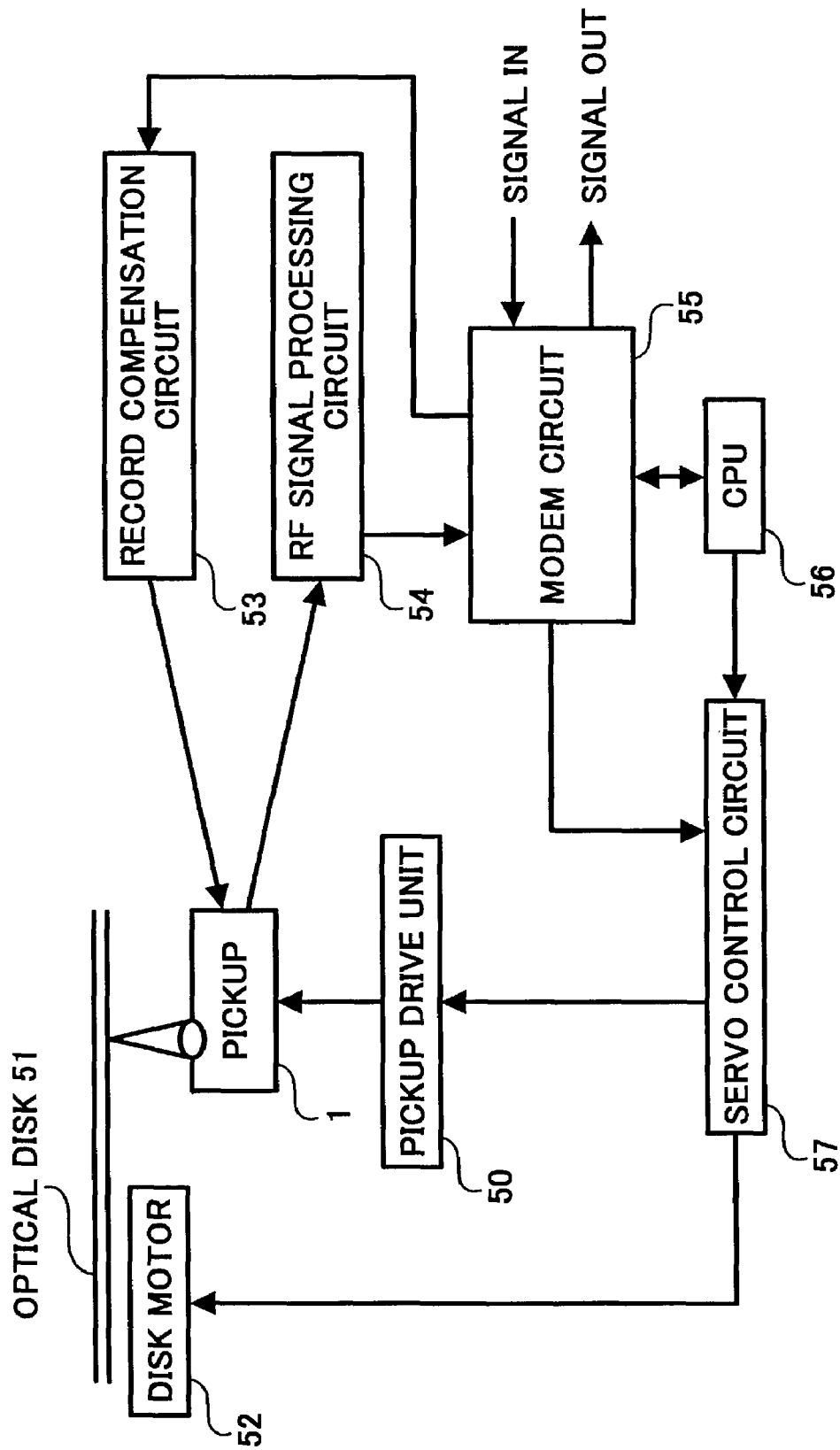
FIG. 10 is a block diagram illustrating an information record/playback apparatus according to another embodiment disclosed herein.
Figure 11:
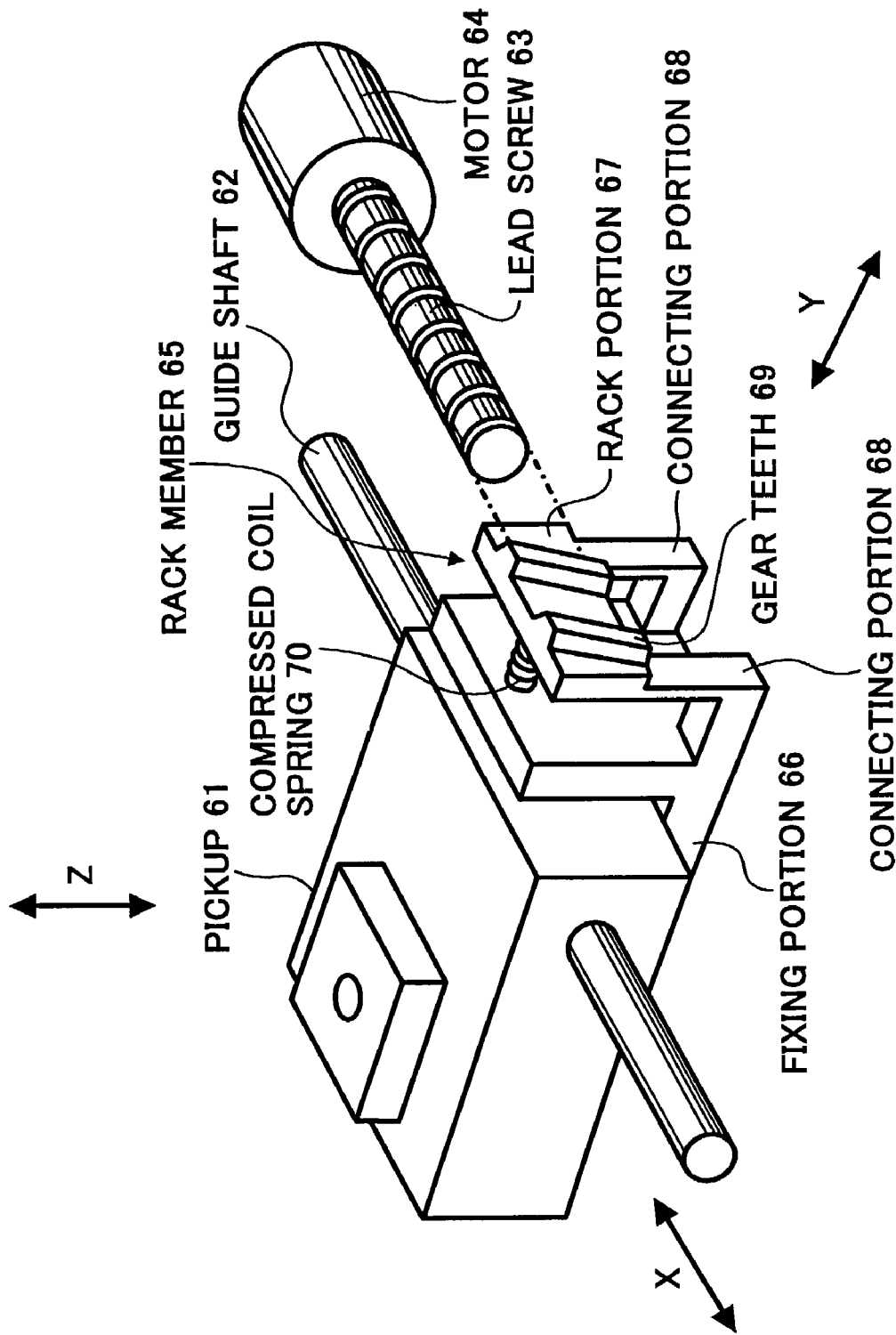
FIG. 11 is a perspective view illustrating the construction of a known pickup drive unit.
Figure 12A:
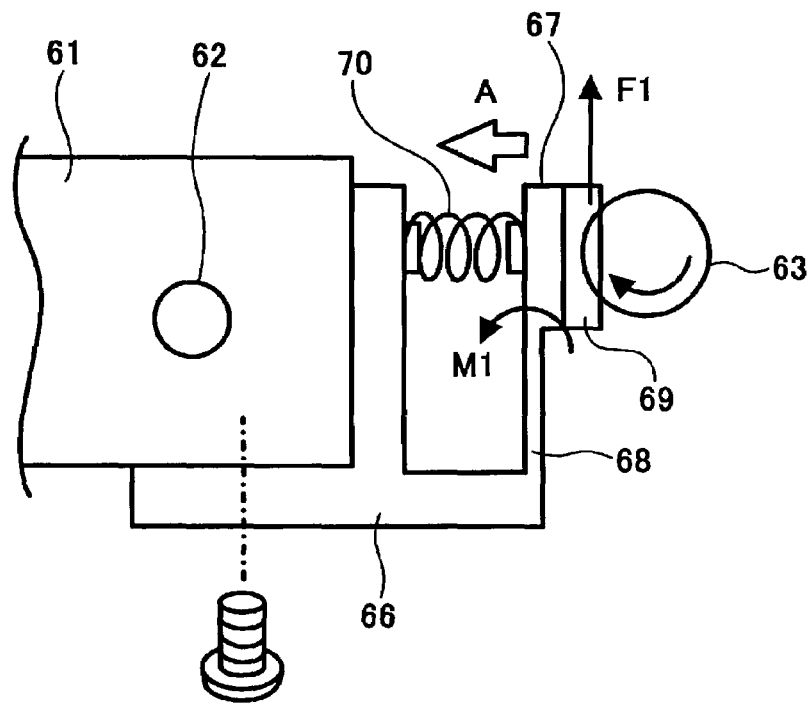
FIG. 12A is a side view along the direction of the axis of lead screw, schematically illustrating the portions of the gear and the grooves on the lead screw of FIG. 11, with the lead screw rotating clockwise.
Figure 12B:
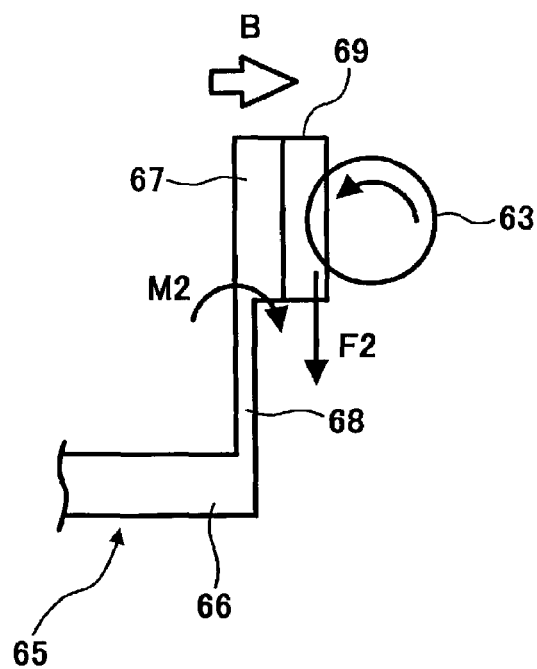
FIG. 12B is a side view along the direction of the axis of lead screw, schematically illustrating the portions of the gear and the grooves on the lead screw of FIG. 11, with the lead screw rotating counterclockwise.

FIG. 10 is a block diagram illustrating an information record/playback apparatus according to another embodiment disclosed herein.

Referring to FIG. 10, the information record/playback apparatus includes at least an optical pickup drive unit 50 for displacing a pickup 1 in the radial direction of an optical disk 51, a disk motor 52 for rotating the optical disk 51, a record compensating circuit 53, an RF signal process circuit 54, a modulation/demodulation circuit 55, a CPU 56, and a servo control circuit 57.

Connected to the modulation/demodulation circuit 55 are several circuit units such as an audio circuit, an image compression/elongation circuit, and interfaces, from which signals are output depending specific uses.

Included in the record compensating circuit 53 is at least a circuit for modulating laser beams based on the signals to be recorded in the optical disk 51. In addition, a waveform shaping circuit is included in the RF signal process circuit 54, for shaping waveforms of recorded signals output from the pickup 1 based on light beams reflected from the optical disk 51.

The servo control circuit 57 serves to detect error components such as tacking and focusing error signals from readout signals, feedback the resulting signals to pickup 1 and disk motor 52, and implement the servo-control to reduce the errors as much as possible.

As the methods of the servo-controlling, focusing servo, tracking servo, and pickup drive servo may be cited. In addition, as the optical pickup drive unit 51 in the present embodiment, ones of the feed-screw type may be adopted as illustrated in FIGS. 1 through 9.

In order to properly implement the pickup drive servo control, tracking error signals are utilized.

If the magnitude of the tracking error signals exceeds a predetermined value, a current is fed to the drive motor 4 (FIG. 6) to activate the rotation thereof. Through the rotation of the drive motor 4, the pickup 1 is displaced along the axial direction of the optical disk 51.

If the magnitude of the tracking error signals falls below a predetermined value, the current fed to the drive motor 4 ceases to flow, and the rotation thereof is discontinued.

The loop of the pickup drive servo is not activated during access movements. Constant currents of either positive or negative sign are fed to the pickup 1 instead, so that the pickup 1 is displaced at high speeds from inner to outer tracks or vice versa, respectively.

During seek operations the pickup unit makes the access at least close the desired track by counting the number of zero-cross points of the tracking signals. Thereafter, the pickup drive servo loop is enabled, and error signals are regenerated to be utilized for computing the discrepancy from the desired track. Then, by further displacing the pickup forward or backward, or jumping over tracks depending on the resulting discrepancy, the access is accomplished.

Subsequently, information recording operations are carried out by irradiating laser beams onto desired locations on the optical disk 51 by means of the pickup 1, or playback operations are made by detecting light beams reflected from desired locations also by the pickup 1.

Although the present optical disk apparatus has been described as a disk drive apparatus of the record/playback type as illustrated in FIG. 10, a disk drive apparatus of the playback type may alternatively be adopted without the record compensating circuit 53.

It is apparent from the above description on the optical pickup drive unit disclosed herein, the deformation at the contact portion between the gear teeth and the lead screw is suitably reduced, and a bending moment does not appear for the part of the plate-shaped connecting portion, even when a frictional force in the tangential direction is caused by the rotation of the lead screw.

As a result, several advantages are offered with the drive unit construction disclosed herein, in which the gear teeth provided on the rack portion can be prevented from riding across the grooves on the lead screw, undue increases in the strength of pressing force are obviated, and frictional loads are reduced. Therefore, the decline of record/playback signal qualities is prevented; and proper pickup drive operations with reduced frictional loads, high speed access, and miniaturization, can be achieved for the pickup drive unit.

The process steps set forth in the present description on the operation of the pickup drive unit and the optical disk apparatus may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus also includes a computer-based product which may be hosted on a storage medium, and includes instructions which can be used to program a microprocessor to perform a process in accordance with the present disclosure. This storage medium can include, but is not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Additional modifications and variations of the present invention are possible in light of the above teachings. It is therefore to be understood that within the scope of the appended claims, the invention may be practiced other than as specifically described herein.

This document claims priority and contains subject matter related to Japanese Patent Application No. 2001-343132 and 2002-138611, filed with the Japanese Patent Office on Nov. 8, 2001 and May 14, 2002, respectively, the entire contents of which are hereby incorporated by reference.

The invention claimed is:

1. A pickup drive unit, comprising:
   a lead screw;
   a drive unit for driving said lead screw;
   a rack portion provided thereon with gear teeth to be engaged with grooves of said lead screw, said rack portion having a first end and a second end;
   a fixing portion connected to a pickup;
   a connecting portion made of a flexible material connecting said rack portion to said fixing portion and supporting said rack portion in a cantilever fashion such that said second end of said rack portion is moved towards said lead screw when said first end of said rack portion is moved away from said lead screw, said connecting portion having a first end connected to said fixing portion and a second end connected to said first end of said rack portion; and
   a pressing member applying a force pressing said rack portion against said lead screw;
   wherein:
   a first distance, in a direction perpendicular to an axial direction of said lead screw, from said first end of said connecting portion to a contact portion between said gear teeth and said lead screw is less than a second distance, in the direction perpendicular to the axial direction of said lead screw, from said first end of said connecting portion to said first end of said rack portion.

2. The pickup drive unit according to claim 1, wherein:
   said connecting portion is plate-shaped and is situated on both sides of said rack portion in the axial direction of said lead screw.

3. The pickup drive unit according to claim 1, wherein:
   said connecting portion is made of metal and also serves as said pressing member for applying a force pressing said rack portion against said lead screw.

4. The pickup drive unit according to claim 1, wherein said first distance is one half of said second distance.

5. An information playback apparatus, comprising:
   a pickup for detecting light beams reflected from an information recording medium;
   a pickup drive unit recited in any one of claims 1, 2, 3, or 4 for driving said pickup; and
   a plurality of circuits for playing back information from said information recording medium based on light beams detected by said pickup.

6. An information recording apparatus, comprising:
a pickup for irradiating laser beams and recording information, on an information recording medium;
a pickup drive unit recited in any one of claims 1, 2, 3, or 4 for driving said pickup; and
a plurality of circuits for at least modulating said laser beams based on information signals.

7. A pickup drive unit, comprising:
lead screw means;
drive means for driving said lead screw means;
rack means provided thereon with gear means to be engaged with grooves of said lead screw means, said rack means having a first end and a second end;
plate-shaped connecting means made of a flexible material for connecting said rack means to fixing means tightened to pickup means and for supporting said rack means in a cantilever fashion such that said second end of said rack means is moved towards said lead screw means when said first end of said rack means is moved away from said lead screw means; and
pressing means for applying a force pressing said rack means against said lead screw means;
wherein said plate-shaped connecting means comprises a first end connected to said fixing means and a second end connected to said first end of said rack means, and wherein a first distance, in a direction perpendicular to an axial direction of said lead screw means, from said first end of said plate-shaped connecting means to a contact portion between said gear means and said lead screw means is less than a second distance from said first end of said plate-shaped connecting means to said first end of said rack means.

8. The pickup drive unit according to claim 7, wherein:
said first distance is one half of said second distance.

9. The pickup drive unit according to claim 7, wherein:
said plate-shaped connecting means is situated on both sides of said rack means in the axial direction of said lead screw means.

10. The pickup drive unit according to claim 7, wherein:
said plate-shaped connecting means is made of metal and also serves as said pressing means for applying a force pressing said rack means against said lead screw means.

11. An information playback apparatus, comprising:
pickup means for detecting light beams reflected from an information recording medium;
pickup drive means recited in any one of claims 7, 8, 9, or 10 for driving said pickup means; and
a plurality of circuit means for playing back information from said information recording medium based on light beams detected by said pickup means.

12. An information recording apparatus, comprising:
pickup means for irradiating laser beams and recording information, on an information recording medium;
pickup drive means recited in any one of claims 7, 8, 9, or 10 for driving said pickup means; and
a plurality of circuit means for at least modulating said laser beams based on information signals.

\* \* \* \* \*